(12) United States Patent
Vieta et al.

(10) Patent No.: US 9,152,842 B2
(45) Date of Patent: Oct. 6, 2015

(54) NAVIGATION ASSISTED FINGERPRINT ENROLLMENT

(71) Applicant: Apple Inc., Cupertino, CA (US)

(72) Inventors: William M. Vieta, Santa Clara, CA (US); Wayne C. Westerman, Burlingame, CA (US); Steven P. Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 13/802,645

(22) Filed: Mar. 13, 2013

(65) Prior Publication Data

US 2014/0003678 A1    Jan. 2, 2014

Related U.S. Application Data

(60) Provisional application No. 61/666,763, filed on Jun. 29, 2012.

(51) Int. Cl.
G06K 9/00 (2006.01)

(52) U.S. Cl.
CPC .................................. *G06K 9/00026* (2013.01)

(58) Field of Classification Search
None
See application file for complete search history.

(56) References Cited

U.S. PATENT DOCUMENTS

| | | | |
|---|---|---|---|
| 5,982,914 A | 11/1999 | Lee et al. | |
| 6,289,114 B1 | 9/2001 | Mainguet | |
| 6,323,846 B1 | 11/2001 | Westerman et al. | |
| 6,546,122 B1 | 4/2003 | Russo | |
| 6,570,557 B1 | 5/2003 | Westerman et al. | |
| 6,677,932 B1 | 1/2004 | Westerman | |
| 6,795,569 B1 | 9/2004 | Setlak | |
| 6,888,536 B2 | 5/2005 | Westerman et al. | |
| 6,898,301 B2 * | 5/2005 | Iwanaga | 382/124 |
| 6,950,540 B2 | 9/2005 | Higuchi | |

(Continued)

FOREIGN PATENT DOCUMENTS

| | | |
|---|---|---|
| EP | 1302907 | 4/2003 |
| EP | 1519326 | 3/2005 |

(Continued)

OTHER PUBLICATIONS

Nasser et al., "User Interface Design of the Interactive Fingerprint Recognition (INFIR) System," Proceedings of the 2006 International Conference on Security & Management, SAM 2006, Jun. 26, 2009, pp. 371-377, XP055084842, retrieved from the Internet on Oct. 22, 2013: URL:http://wwl.ucmss.com/books/LFS/CSREA2006/SAM8023.pdf.

(Continued)

*Primary Examiner* — Daniel Mariam
(74) *Attorney, Agent, or Firm* — Brownstein Hyatt Farber Schreck, LLP

(57) ABSTRACT

An electronic device can include at least one fingerprint image sensor that obtains fingerprint image information, where the fingerprint information can include at least a first partial fingerprint image and a second partial fingerprint image. At least one fingerprint navigation sensor can be disposed to receive navigation information responsive to at least one of movement or orientation of a user's finger with respect to the at least one fingerprint image sensor. At least one processing unit can combine the first partial fingerprint image and the second partial fingerprint image into at least one combined fingerprint image utilizing the navigation information.

20 Claims, 4 Drawing Sheets

(56) References Cited

U.S. PATENT DOCUMENTS

| | | |
|---|---|---|
| 6,961,452 B2 | 11/2005 | Fujii |
| 7,194,116 B2 | 3/2007 | Du et al. |
| 7,280,677 B2 | 10/2007 | Chandler et al. |
| 7,599,530 B2 | 10/2009 | Boshra |
| 7,616,787 B2 | 11/2009 | Boshra |
| 7,693,314 B2 | 4/2010 | Tykowski et al. |
| 8,131,026 B2 * | 3/2012 | Benkley et al. ............... 382/124 |
| 8,295,561 B2 | 10/2012 | Kwan |
| 8,358,815 B2 | 1/2013 | Benkley et al. |
| 8,611,618 B2 | 12/2013 | Kwon et al. |
| 8,913,802 B2 | 12/2014 | Han et al. |
| 2004/0146186 A1 | 7/2004 | Gelbord et al. |
| 2007/0263912 A1 | 11/2007 | Biarnes et al. |
| 2008/0155269 A1 | 6/2008 | Yoshikawa |
| 2010/0027854 A1* | 2/2010 | Chatterjee et al. ............ 382/124 |
| 2010/0220900 A1* | 9/2010 | Orsley .......................... 382/124 |
| 2011/0044513 A1* | 2/2011 | McGonagle et al. ......... 382/124 |
| 2013/0064434 A1 | 3/2013 | Riopka et al. |
| 2013/0259330 A1 | 10/2013 | Russo et al. |
| 2013/0278383 A1 | 10/2013 | Boshra |
| 2013/0279768 A1 | 10/2013 | Boshra |
| 2014/0003679 A1 | 1/2014 | Han et al. |
| 2014/0003681 A1 | 1/2014 | Wright et al. |
| 2015/0139512 A1 | 5/2015 | Han et al. |

FOREIGN PATENT DOCUMENTS

| | | |
|---|---|---|
| EP | 1533759 | 5/2005 |
| TW | 201120763 | 6/2011 |

OTHER PUBLICATIONS

Riley et al., "Instruction, Feedback and Biometrics: The User Interface for Fingerprint Authentication Systems," Human-Computer Interaction A Interact, 2009, Springer Berlin Heidelberg, pp. 293-305, XP019126310, ISBN: 978-3-642-03657-6.

Uz et al., "Minutiae-Based Template Synthesis and Matching Using Hierarchical Delaunay Triangulations," *Biometrics: Theory, Applications, and Systems*, 2007, First IEEE International Conference, Sep. 1, 2007, pp. 1-8, XP031189988, ISBN: 978-1-4244-1596-0, Section II, IV, V.

Cappelli, "SFinGe: an Approach to Synthetic Fingerprint Generation," DEIS, University of Bologna, Italy, 2004.

* cited by examiner

NAVIGATION ASSISTED FINGERPRINT ENROLLMENT

CROSS-REFERENCE TO RELATED APPLICATION

The present application claims the benefit under 35 U.S.C. §119(e) to U.S. Provisional Patent Application No. 61/666,763, which was filed on Jun. 29, 2012, and entitled "Navigation Assisted Fingerprint Enrollment," which is incorporated by reference as if fully disclosed herein.

BACKGROUND

1. Field of the Disclosure

This application generally relates to fingerprint recognition sensors.

2. Background of the Disclosure

Fingerprint recognition systems generally provide for collection of fingerprint images and comparing those images against a database of known fingerprint information. For example, after collecting and processing a set of fingerprint images for an authorized user, an accessing user can be authorized by collecting one or more fingerprint images from that accessing user, and comparing those collected fingerprint images, for that accessing user, against known fingerprint information for that authorized user.

It sometimes occurs that, when collecting fingerprint images, whether from an authorized user, from an accessing user, or from a new user, the user's finger might move, twist, yaw, pitch, or undergo a change in orientation with respect to another axis with respect to the fingerprint image sensor during the fingerprint image collection process. For example, if multiple portions of the image are collected at different times or by different sensors, it would be useful to know whether the user's finger has moved, or changed orientation with respect to any axis, during collection of those multiple portions of that fingerprint image, such as for piecing those multiple portions together into a single unified fingerprint image.

It sometimes occurs that, when collecting and processing portions of fingerprint images, similarly, whether from an authorized user, from an accessing user, or from a new user, involves determining an amount of motion, or change in orientation with respect to any axis, of the user's finger with respect to the fingerprint recognition sensor. For example, if the user's finger has moved between fingerprint recognition sensing of a first portion of the user's fingerprint (a first "swatch", as described below) and a second portion of the user's fingerprint (a second "swatch", as described below), it might be desirable to adjust the positioning or orientation of the first portion of the user's fingerprint and the second portion of the user's fingerprint before attempting to stitch them together into a unified fingerprint image, with the effect that the collected unified fingerprint image from the known user, the accessing user, or a new user, can be more accurately processed for fingerprint information.

Each of these examples, as well as other possible considerations, can cause one or more difficulties for the fingerprint recognition sensor, at least in that stitching together a first portion of the user's fingerprint and a second portion of the user's fingerprint might introduce errors if changes in positioning or orientation of the user's finger between collection of that first portion of the user's fingerprint and that second portion of the user's fingerprint are not accounted for. When such errors are introduced, fingerprint enrollment and fingerprint recognition may be subject to undesired failures, to the possible document of the effectiveness and value of the fingerprint recognition device.

BRIEF SUMMARY OF THE DISCLOSURE

This application provides techniques, including circuits and designs, which can determine changes in position and orientation (with respect to one or more axes) of one or more portions of a fingerprint image, and which can be incorporated into devices using fingerprint recognition and sensing. This application also provides techniques, including devices which can adjust the position and orientation of one or more portions of the fingerprint image with respect to each other when combining those portions of the fingerprint image into a unified fingerprint image, and in response thereto, perform fingerprint recognition and sensing.

In one embodiment, techniques can include providing a fingerprint recognition sensor in which one or more navigation sensors, in addition to one or more fingerprint sensors, can assist in determining a position and an orientation (with respect to one or more axes) of a user's finger for which a portion of a fingerprint image is being received, such as for enrollment of a known user, or for comparison of an accessing user with fingerprint information of one or more known users.

In one embodiment, techniques can include providing a fingerprint recognition sensor in which one or more navigation sensors, in addition to one or more fingerprint sensors, can assist in determining a change in position and orientation (the latter with respect to one or more axes) of a user's finger for which a portion of a fingerprint image is being received for enrollment of a known user, or for comparison of an accessing user with fingerprint information of one or more known users, at times while that fingerprint image is being received.

In one embodiment, techniques can include providing a fingerprint recognition sensor in which one or more navigation sensors, in addition to one or more fingerprint sensors, can provide a set of portions of a fingerprint image, together with information with respect to navigation of the user's finger while receiving that portion of the fingerprint image, with the effect that the portion of the fingerprint image can be collected with other portions of the fingerprint image to provide a unified fingerprint image.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE FIGURES

While the specification concludes with claims particularly pointing out and distinctly claiming the subject matter that is regarded as forming the present disclosure, it is believed that the disclosure will be better understood from the following description taken in conjunction with the accompanying Figures, in which:

DETAILED DESCRIPTION

Figure 1:
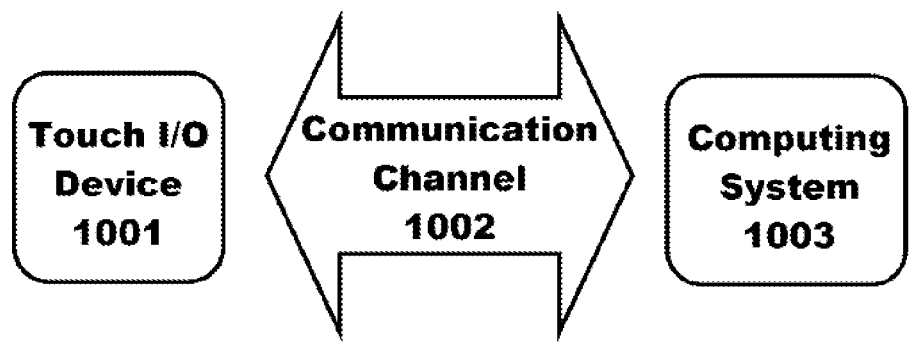
FIG. 1 shows a conceptual drawing of communication between a touch I/O device and a computing system.

Embodiments described herein provide an electronic device that can determine changes in position and orientation of one or more partial fingerprint images. Embodiments described herein may be configured to operate with a variety of sensors, including strip or swipe sensors, array or other two-dimensional sensors, and the like. The partial fingerprint images can be captured by at least one fingerprint image sensor. Navigation information about position and orientation changes of a finger or fingers can be obtained by at least one navigation sensor. For example, when obtaining fingerprint images, a user's finger can move, twist, and/or change pitch or orientation during the fingerprint image collection process.

Using the navigation information, one or more of the partial fingerprint images can be adjusted to account for the motion of the user's finger or fingers. For example, if the motion of the user's finger or fingers includes straight line motion, the electronic device can translate in a linear direction one partial fingerprint image with respect to another partial fingerprint image. As another example, if the motion of the user's finger(s) includes angular motion, the electronic device can rotate a partial fingerprint image with respect to another partial fingerprint image. In some embodiments, two or more partial fingerprint images can be adjusted using the navigation information. For example, a first partial fingerprint image can be translated in at least one linear direction with respect to a second partial fingerprint image, and the second partial fingerprint image can be rotated with respect to the first partial fingerprint image.

A combined fingerprint image can be produced by combining two or more partial fingerprint images. Some or all of the partial fingerprint images can be adjusted prior to the formation of the combined fingerprint image. The combined fingerprint image can be used, for example, to enroll the user in a fingerprint recognition system, or to provide access to data, a device, or a system by comparing the combined fingerprint image with fingerprint images stored in a database containing known fingerprint information.

Terminology

The following terminology is exemplary, and not intended to be limiting in any way.

The text "capacitive sensing element", and variants thereof, generally refers to one or more data elements of any kind, including information sensed with respect to individual locations. For example and without limitation, a capacitive sensing element can include data or other information with respect to a relatively small region of a fingerprint image.

After reading this application, those skilled in the art would recognize that these statements of terminology would be applicable to techniques, methods, physical elements, and systems (whether currently known or otherwise), including extensions thereof inferred or inferable by those skilled in the art after reading this application.

Fingerprint Sensor Device and System

FIG. 1 shows a conceptual drawing of communication between a touch I/O device and a computing system.

Figure 2:
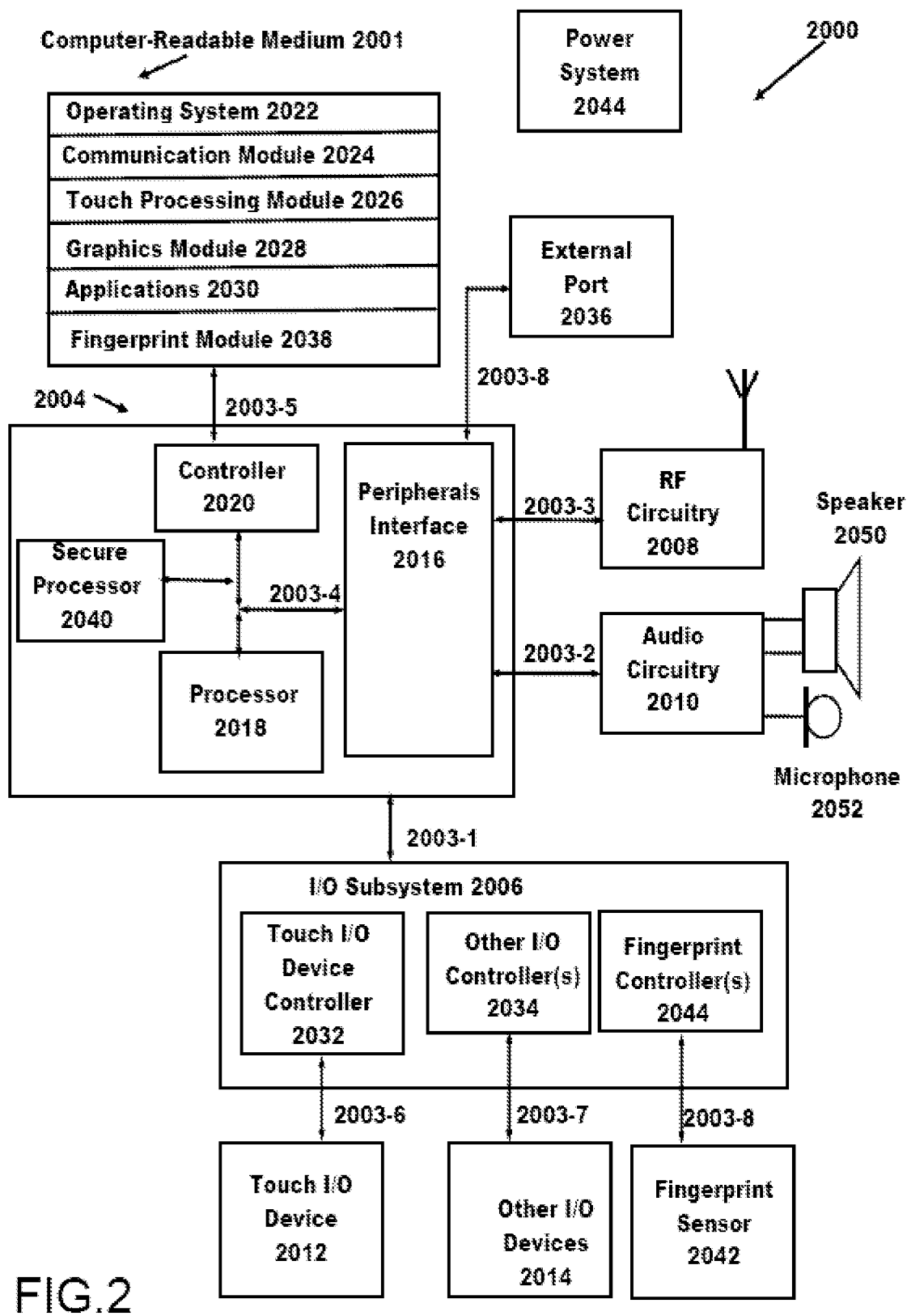
FIG. 2 shows a conceptual drawing of a system including a fingerprint recognition device.

FIG. 2 shows a conceptual drawing of a system including a fingerprint recognition device.

Described embodiments may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

For example, touch I/O device 1001 can interact with a user with the user touching the touch I/O device 1001 with the user's finger (or otherwise bringing the user's finger near to the touch I/O device 1001), with the effect that the touch I/O device 1001 can receive fingerprint image data, and optionally provide feedback to the user that the fingerprint image data was received.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures or fingerprints. A gesture or fingerprint may correspond to stationary or non-stationary, single or multiple, touches or near touches on touch I/O device 1001. A gesture or fingerprint may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture or fingerprint may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner. For example, feedback can include interaction with a user indicating (A) that one or more sets of fingerprint image information have been received, (B) that one or more sets of fingerprint image information have been enrolled in a database, (C) that one or more sets of fingerprint image information have been confirmed as associated with the user, or otherwise.

Attention is now directed towards embodiments of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. A block diagram of one embodiment of system 2000 can generally include one or more computer-readable mediums 2001, processing system 2004, Input/Output (I/O) subsystem 2006, radio frequency (RF) or other electromagnetic (EMF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations.

It should be apparent that the architecture shown in the figure is only one example architecture of system 2000, and that system 2000 could have more or fewer components than shown, or a different configuration of components. The various components shown in the figure can be implemented in hardware, software, firmware or any combination thereof, including one or more signal processing and/or application specific integrated circuits.

EMF circuitry 2008 is used to send and receive information over a wireless link or network to one or more other devices and includes well-known circuitry for performing this function. EMF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated, or any other form of signal modulation). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 can execute or interpret various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via EMF circuitry 2008 and includes various software components for handling data received from EMF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 can include components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS) or other positioning systems), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include fingerprint sensing module 2038 for performing the method/functions as described herein in connection with FIGS. 1-4. Fingerprint sensing module 2038 may at least be executed to, or otherwise function to, perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may include technologies as described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

In embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. Secure processor 2040 may be implemented as one or more processing units. The operation of these various elements will now be described.

The fingerprint sensor 2042 may operate to capacitively capture a series of images, or nodes. When taken together, these nodes may form a set of fingerprint image information. A collection of nodes may be referred to herein as a "mesh", "mosaic", "template", or other indicator of fingerprint information.

Each node of fingerprint information may be separately captured by the fingerprint sensor 2042, which may be an array sensor. Generally, there can be some overlap between images in nodes representing adjacent or nearby portions of a fingerprint. Such overlap may assist in assembling the fingerprint from the nodes, as various image recognition techniques may be employed to use the overlap to properly identify and/or align adjacent nodes in the fingerprint information.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. The fingerprint data is encrypted, obfuscated, or otherwise prevented from being accessed by an unauthorized device or element, by any of the fingerprint sensor 2042, the fingerprint I/O controller 2044 or another element prior to being transmitted to either processor. The secure processor 2040 may decrypt the data to reconstruct the node. In some embodiments, unencrypted data may be transmitted directly to the secure processor 2040 from the fingerprint controller 2044 (or the sensor 2042 if no controller is present). The secure processor may then encrypt this data.

Fingerprint data, either as individual nodes, collections of nodes, or substantially complete fingerprint templates, may be stored in the computer-readable medium 2001 and accessed as necessary. In some embodiments, only the secure processor 2040 may access stored fingerprint data, while in other embodiments either the secure processor or the processor 2018 may access such data.

Fingerprint Sensor Including Navigation Sensors

Figure 3:
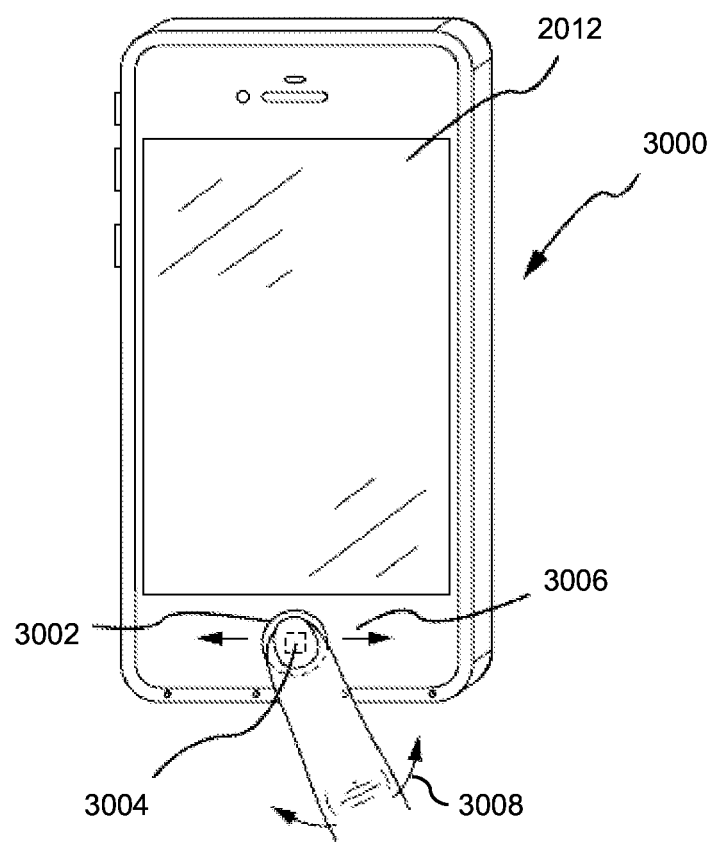
FIG. 3 shows a conceptual drawing of a first example fingerprint sensor and one or more navigation sensors included in a portion of a device.

FIG. 3 shows a conceptual drawing of a first example fingerprint sensor and one or more navigation sensors included in a portion of a device.

A device, such as a smart phone or a tablet computer, includes a fingerprint sensor, on or near which the user places their finger, with the effect that the fingerprint sensor can receive one or more fingerprint images. In one embodiment, the fingerprint sensor optionally includes the touch I/O device 2012 described herein, and further optionally includes one or more computing devices, such as the processor 2018 and the secure processor 2040 described herein. Moreover, the fingerprint sensor can include, or have access to, memory or storage in which it can maintain and manipulate fingerprint information, such as one or more databases of fingerprint information which can be used to manipulate and compare fingerprint information, as described herein.

In one embodiment, the touch I/O device 2012 includes one or more touch buttons 3002, such as can be each incorporated into the touch I/O device 2012 at a particular position, and such as can be each disposed for interaction between a user and the touch I/O device 2012. For example, one or more touch buttons can generate signals for interpretation by the processor 2018 or the secure processor 2040, with the effect that inputs to operating system software or application software, or both, can be effected.

In one embodiment, the touch I/O device 2012 can include a fingerprint recognition sensor disposed below the touch button, with the effect that when the user's finger interacts with the touch button 3002, the fingerprint recognition sensor can receive at least a portion of a fingerprint image (herein sometimes called a "patch" or a "swatch"). For example, the fingerprint recognition sensor can be disposed in a location such that when the user's finger touches the touch button, the fingerprint recognition sensor can receive fingerprint image information with respect to at least that portion of the user's finger which touches the touch button.

In one embodiment, the touch I/O device 2012 can include one or more navigation sensors disposed under or near the touch button, with the effect that when the user's finger touches (or approaches close enough to) the touch button, the one or more navigation sensors can determine whether the user desires to navigate right, left, up, or down. For example, the navigation sensors can be responsive to movement of the user's finger right, left, up, or down, such as to navigate in a direction indicated by the user's finger (or alternatively, in a direction opposite to the movement by the user's finger). This can have the effect that the user can navigate a pointer or other object on a screen, such as moving that pointer or other object right, left, up, or down, as appropriate.

In one embodiment, the touch I/O device 2012 can include both the fingerprint recognition sensor and the navigation sensor 3004 as a single sensor with multiple capabilities, such as including a fingerprint recognition sensor mode, a navigation sensor mode, a standby mode, and possibly other modes. However, in the context of the invention, there is no particular requirement for any such limitation. For example, in alternative embodiments, the touch I/O device 2012 can include more than one sensor, each with separate functions, such as possibly a separate fingerprint recognition sensor and a separate navigation sensor. As described herein, the fingerprint recognition sensor includes both possibilities of (A) a fingerprint recognition sensor mode of a single sensor, and (B) a separate fingerprint recognition sensor. Similarly, as described herein, the navigation sensor includes both possibilities of (A) a navigation sensor mode of a single sensor, and (B) a separate navigation sensor.

In one embodiment, the touch I/O device 2012 can include the one or more sensors (that is, either one or more sensors with both fingerprint recognition sensor mode and navigation sensor mode capabilities, or one or more separate fingerprint recognition sensors and one or more separate navigation sensors, or some combination or conjunction thereof), in one or more of several locations. For example, the one or more sensors can be located in one or more of (A) underneath a touch button activated by the user's finger, (B) between a cover location activated by the user's finger and a touch button also activated by the user's finger, (C) in a column or disposed nearby each other, with the effect that the user's finger activating the touch button is sufficiently close to be detected by either or both sensors, (D) on a side or back of the touch I/O device 2012, (E) otherwise located in or on the touch I/O device 2012, or some combination or conjunction thereof. After reading this application, those skilled in the art would recognize that a wide variety of possibilities for location and coordination of sensors would be workable, are within the scope and spirit of the invention, and would not require further invention or undue experiment.

For example, with the one or more navigation sensors, the user can direct the touch I/O device 2012 to move a pointer or other object about the screen, with the effect that the user can place the pointer or other object at substantially any desired position on that screen.

Similarly, in one embodiment, the navigation sensors disposed in the touch I/O device 2012 can include the capability that when the user's finger touches (or approaches close enough to) the touch button, the one or more navigation sensors can determine whether the user desires to reorient the user's finger with respect to one or more axes, such as for example by altering a twist, yaw, pitch, or orientation with respect to another axis. For example, the navigation sensors can be responsive to movement of the user's finger twisting counterclockwise or clockwise, yawing counterclockwise or clockwise, pitching counterclockwise or clockwise, or otherwise reorienting with respect to another axis. This can have the effect that the user can navigate a pointer or other object on the screen, such as turning that pointer or other object about one or more indicated axes.

For example, with the one or more navigation sensors, the user can direct the touch I/O device 2012 to turn a pointer or other object within the screen, with the effect that the user can orient the pointer or other object at substantially any desired orientation with respect to that screen, or with respect to a three-dimensional model being presented by that screen.

Using Navigation Sensors to Determine Swatch Offset and Twist

Figure 5:
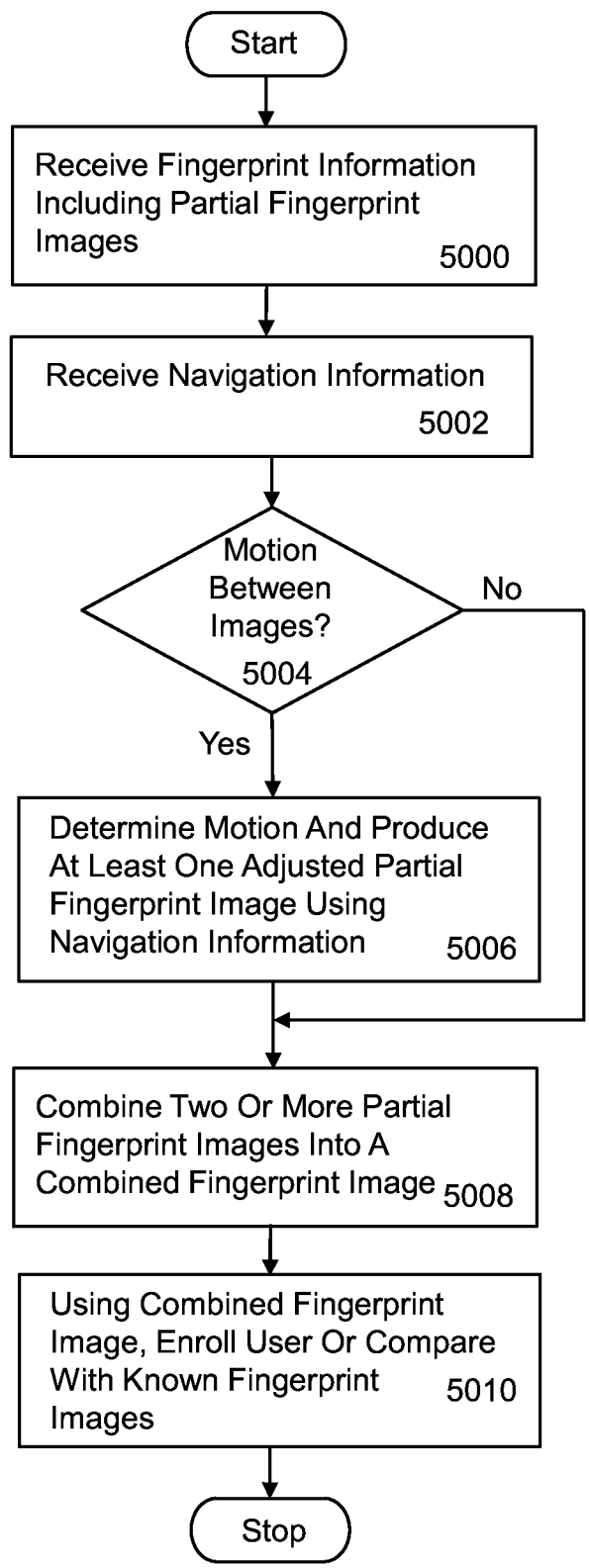
FIG. 5 is a flowchart of a method for sensing fingerprints.

FIG. 5 is a flowchart of a method for sensing fingerprints. In one embodiment, a fingerprint recognition system receives information both from the navigation sensors and from the fingerprint recognition sensor (blocks 5000 and 5002), with the effect that the fingerprint recognition system can determine, for a first portion of a fingerprint image (a first "swatch") and a second portion of a fingerprint image (a second "swatch"), what motion was made by the user's finger during a time between when the first swatch was received and when the second swatch was received (block 5004). For example, if the user's finger moved to the right during a time between when the first swatch was received and when the second swatch was received, the fingerprint recognition system will become aware that there might be a gap (if in one direction) or an overlap (if in another direction) between the first swatch and the second swatch.

With this information, the fingerprint recognition system can adjust the information received for the first swatch and for the second swatch, to account for the motion of the user's finger (block 5006). In such cases, the motion of the user's finger can include straight-line motion (represented by 3006 in FIG. 3), such as left, right, up, or down, and angular motion (represented by 3008 in FIG. 3) such as twist, yaw, pitch, or a change in orientation with respect to another axis.

For example, if the motion of the user's finger includes straight-line motion, the fingerprint recognition system can adjust the information received for the second swatch so that it is translated in a linear direction with respect to the first swatch. Similarly, if the motion of the user's finger includes angular motion, the fingerprint recognition system can adjust the information received for the second swatch so that it is rotated with respect to the first swatch. More generally, the fingerprint recognition system can adjust the information received by the second swatch using an affine transformation (that is, a transformation which can combine linear motion and angular motion) with respect to the first swatch.

Having adjusted the second swatch using an affine transformation, the fingerprint recognition system can attempt to match the first swatch with the second swatch. For example, the fingerprint recognition system, having adjusted the second swatch with respect to the first swatch, can attempt to overlap an edge where the first swatch and the second swatch should be adjacent.

In one such example, each swatch includes an 8×8 block of capacitive sensing elements received by the fingerprint recognition sensor. In one such example, the first swatch and the second swatch include an adjacent edge which overlaps both, and includes an 8×2 block of capacitive sensing elements common to both.

In alternative embodiments, the fingerprint recognition system can use the navigation information to partially adjust the first swatch and to partially adjust the second swatch, such as by applying some of the navigation information to the first swatch and by applying some of the navigation information to the second swatch. This would have the effect that, of the transformation implied by the navigation information, only a portion would be applied to the first swatch, only a portion would be applied to the second swatch, but the full transformation would collectively be applied to the combination of the first swatch and the second swatch.

Operation of Processor on Received Fingerprint Image Information

Figure 4:
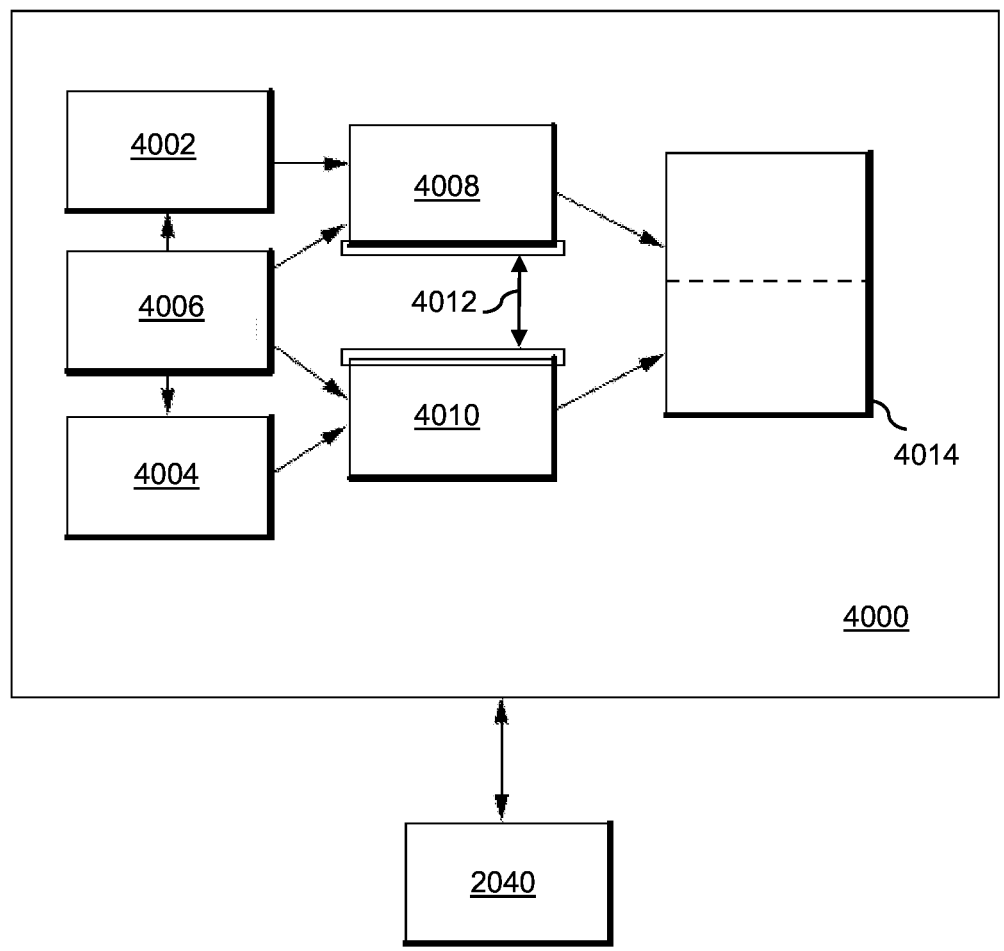
FIG. 4 shows a conceptual drawing of a secure processor and a memory or storage device, processing a fingerprint image.

FIG. 4 shows a conceptual drawing of a secure processor and a memory or storage device, processing a fingerprint image.

In one embodiment, the touch I/O device 2012 includes a secure processor 2040, and include, or has access to, a memory or storage device 4000, with the effect that the secure processor 2040 can maintain and manipulate fingerprint image data, along with associated navigation information.

In one embodiment, each database of fingerprint information can include a set of fingerprint image data, which can include a set of fingerprint image capacitive sensing elements, such as responsive to the touch I/O device 2012 described herein. For example, each set of fingerprint image capacitive sensing elements can include one or more blocks of fingerprint image capacitive sensing elements received in response to the touch I/O device 2012, and maintained in memory or storage included with or accessible to the secure processor 2040.

In one embodiment, individual swatches 4002, 4004 of the user's fingerprint image are captured by the fingerprint sensor, rather than an entire fingerprint image. Each sequential pair of swatches of the user's fingerprint image is associated with navigation information 4006, such as representing changes in direction or orientation of the user's finger as portions of the user's fingerprint image are captured, and as the latter is received from one or more navigation sensors.

In one embodiment, the secure processor 2040 adjusts the received image swatch information with respect to the received navigation information, with the effect of providing adjusted image swatch information 4008, 4010.

In one embodiment, the secure processor 2040 can match the edges of each adjacent first swatch and second swatch (represented by 4012), with the effect of determining at least one or more of (A) whether the adjacent first swatch and second swatch are sufficiently similar as to be considered adjacent, and (B) whether the navigation information has been sufficiently applied to the either the first swatch, the second swatch, or both, so as to best match swatches known to be adjacent.

In one embodiment, the secure processor 2040 can combine a first adjusted swatch (that is, adjusted fingerprint image information for a first swatch) with a second adjusted swatch (that is, adjusted fingerprint image information for a second swatch), with the effect of providing a combined data structure 4014, representing a unified first image swatch and second image swatch.

In one embodiment, the secure processor 2040 can collect and combine a sufficient number of such image swatches, with the effect of providing a unified fingerprint image (see block 5008 in FIG. 5). The unified fingerprint image can be at least one of (A) enrolled and associated with a known user, (B) associated with an accessing user and compared with a database of fingerprint information associated with known users.

When enrolling and associating a fingerprint image with a known user (see block 5010 in FIG. 5), the secure processor 2040 can engage in further processing, such as determining a set of information for relatively more convenient comparison. Similarly, when comparing an accessing user's fingerprint image with a database of known user's fingerprint information, the secure processor 2040 can engage in further processing, such as determining a set of information for relatively more convenient comparison.

Alternative Embodiments

After reading this application, those skilled in the art would recognize that techniques for recognizing navigation information associated with portions of fingerprint images, and using that associated navigation information to aid with combining those portions of fingerprint images into unified fingerprint images is responsive to, and transformative of, real-world data such as fingerprint image data received from a user's fingerprint, and provides a useful and tangible result in the service of enrolling and comparing fingerprints in a biometric security context. Moreover, after reading this application, those skilled in the art would recognize that processing of fingerprint data by a computing device includes substantial computer control and programming, involves substantial records of fingerprint information, and involves interaction with fingerprint sensing hardware and optionally a user interface for fingerprint enrollment and authentication.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. A fingerprint sensing system, comprising:
at least one fingerprint image sensor that obtains fingerprint image information including at least a first partial fingerprint image and a second partial fingerprint image, wherein the at least one fingerprint image sensor is disposed below a touch button;
at least one fingerprint navigation sensor disposed below the touch button and configured to receive navigation information responsive to at least one of movement or orientation of a user's finger on the touch button with respect to the at least one fingerprint image sensor; and
at least one processing unit operably connected to the at least one fingerprint image sensor and the at least one fingerprint navigation sensor and configured to operate in multiple modes, the multiple modes comprising:
a fingerprint recognition mode that combines the first partial fingerprint image and the second partial fingerprint image into at least one combined fingerprint image by adjusting at least one partial fingerprint image with respect to another partial fingerprint image utilizing at least one affine transformation based on the navigation information;
a navigation mode that navigates an object on a display based on navigation information from the at least one fingerprint navigation sensor; and
a standby mode.

2. The fingerprint sensing system of claim 1, wherein the at least one processing unit utilizes the navigation information to determine at least one change in position between the first partial fingerprint image and the second partial fingerprint image.

3. The fingerprint sensing system of claim 2, wherein the at least one change in position between the first partial fingerprint image and the second partial fingerprint image comprises at least one of straight-line motion, angular motion, and a change in orientation with respect to an axis.

4. The fingerprint sensing system of claim 3, wherein at least one of: the straight-line motion comprises at least one of left motion, right motion, up motion, or down motion; and the angular motion comprises at least one of twist motion, yaw motion, or pitch motion.

5. The fingerprint sensing system of claim 1, wherein at least one processing unit that combines the first partial fingerprint image and the second partial fingerprint image into the at least one combined fingerprint image utilizing the navigation information combines by utilizing the navigation information to correct at least one gap or at least one overlap between the first partial fingerprint image and the second partial fingerprint image.

6. The fingerprint sensing system of claim 1, wherein at least one processing unit that combines the first partial fingerprint image and the second partial fingerprint image into the at least one combined fingerprint image utilizing the navigation information combines by performing at least one of:
translating the second partial fingerprint image in at least one linear direction with respect to the first partial fingerprint image;
rotating the second partial fingerprint image with respect to the first partial fingerprint image;
translating the second partial fingerprint image in at least one first linear direction with respect to the first partial fingerprint image and the first partial image in at least one second linear direction with respect to the second partial fingerprint image; and
rotating the second partial fingerprint image with respect to the first partial fingerprint image and the first partial fingerprint image with respect to the second partial fingerprint image.

7. The fingerprint sensing system of claim 1, wherein adjusting at least one partial fingerprint image with respect to another partial fingerprint image utilizing at least one affine transformation comprises:
adjusting the second partial fingerprint image with respect to the first partial fingerprint image utilizing at least one first affine transformation and the first partial fingerprint image with respect to the second partial fingerprint image utilizing at least one second affine transformation.

8. The fingerprint sensing system of claim 1, wherein at least one processing unit that combines the first partial fingerprint image, the second partial fingerprint image, and at least one additional partial fingerprint image into the at least one combined fingerprint image.

9. The fingerprint sensing system of claim 1, wherein the first partial fingerprint image and the second partial fingerprint image are images of a same fingerprint.

10. The fingerprint sensing system of claim 1, wherein at least one processing unit that combines the first partial fingerprint image and the second partial fingerprint image into the at least one combined fingerprint image utilizing the navigation information combines as part of enrolling a user in at least one fingerprint recognition system or comparing an accessing user with fingerprint information of at least one known user.

11. A method for sensing fingerprints, comprising:
   obtaining fingerprint image information, utilizing at least one processing unit via at least one fingerprint image sensor, including at least a first partial fingerprint image and a second partial fingerprint image;
   receiving navigation information, utilizing the at least one processing unit via at least one fingerprint navigation sensor, responsive to at least one of movement or orientation of a user's finger with respect to the at least one fingerprint image sensor; and
   combining the first partial fingerprint image and the second partial fingerprint image into at least one combined fingerprint image based on the navigation information, utilizing the at least one processing unit, by adjusting the second partial fingerprint image with respect to the first partial fingerprint image utilizing at least one first affine transformation and the first partial fingerprint image with respect to the second partial fingerprint image utilizing at least one second affine transformation.

12. The method of claim 11, wherein said operation of combining the first partial fingerprint image and the second partial fingerprint image into at least one combined fingerprint image is performed as part of enrolling a user in at least one fingerprint recognition system or comparing an accessing user with fingerprint information of at least one known user.

13. The method of claim 11, wherein said operation of combining the first partial fingerprint image and the second partial fingerprint image into at least one combined fingerprint image comprises: combining the first partial fingerprint image, the second partial fingerprint image, and at least one additional partial fingerprint image into at least one combined fingerprint image.

14. The method of claim 11, wherein said operation of combining the first partial fingerprint image and the second partial fingerprint image into at least one combined fingerprint image comprises: determining at least one change in position between the first partial fingerprint image and the second partial fingerprint image utilizing the navigation information.

15. The method of claim 11, wherein said operation of combining the first partial fingerprint image and the second partial fingerprint image into at least one combined fingerprint image comprises: correcting at least one gap or at least one overlap between the first partial fingerprint image and the second partial fingerprint image.

16. The method of claim 11, wherein the at least one change in position between the first partial fingerprint image and the second partial fingerprint image comprises at least one of straight-line motion, angular motion, and a change in orientation with respect with respect to an axis.

17. The method of claim 16, wherein at least one of: the straight-line motion comprises at least one of left motion, right motion, up motion, or down motion; and the angular motion comprises at least one of twist motion, yaw motion, or pitch motion.

18. An apparatus, comprising:
   a touch button;
   one or more fingerprint image sensors disposed below the touch button and configured to provide fingerprint image information, said fingerprint image information including one or more partial fingerprint images;
   one or more fingerprint navigation sensors disposed below the touch button and configured to receive navigation information responsive to at least one of: movement, orientation, of a user's finger on the touch button with respect to said one or more fingerprint image sensors; and
   one or more circuits coupled to said fingerprint navigation sensors and to said fingerprint image sensors and configured to operate the one or more fingerprint image sensors or the one or more fingerprint navigation sensors in multiple modes, the multiple modes comprising:
      a fingerprint recognition mode that combines information from said fingerprint navigation sensors and said fingerprint image sensors to produce at least one combined fingerprint image by adjusting at least one partial fingerprint image with respect to another partial fingerprint image utilizing at least one affine transformation based on the navigation information;
      a navigation mode that navigates an object on a display based on navigation information from said one or more navigation sensors; and
      a standby mode.

19. The apparatus of claim 18, wherein the display comprises a supplemental display communicably connected to the apparatus.

20. The apparatus of claim 18, wherein adjusting at least one partial fingerprint image with respect to another partial fingerprint image utilizing at least one affine transformation comprises adjusting the second partial fingerprint image with respect to the first partial fingerprint image utilizing at least one first affine transformation and the first partial fingerprint image with respect to the second partial fingerprint image utilizing at least one second affine transformation.

* * * * *

UNITED STATES PATENT AND TRADEMARK OFFICE
CERTIFICATE OF CORRECTION

PATENT NO. : 9,152,842 B2
APPLICATION NO. : 13/802645
DATED : October 6, 2015
INVENTOR(S) : William M. Vieta et al.

Page 1 of 1

It is certified that error appears in the above-identified patent and that said Letters Patent is hereby corrected as shown below:

In the Claims:

Claim 8, Column 14, line 61:

delete "that"

Signed and Sealed this
Twenty-third Day of August, 2016

Michelle K. Lee
*Director of the United States Patent and Trademark Office*